US012764642B2

(12) United States Patent
Jia et al.

(10) Patent No.: US 12,764,642 B2
(45) Date of Patent: Oct. 13, 2026

(54) OPTIMIZED FILS DISCOVERY AND BEACON SCHEME FOR MULTIPLE MBSSID GROUPS

(71) Applicant: HEWLETT PACKARD ENTERPRISE DEVELOPMENT LP, Spring, TX (US)

(72) Inventors: Xuguang Jia, Beijing (CN); Xiaoyang Fu, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 294 days.

(21) Appl. No.: 18/788,852

(22) Filed: Jul. 30, 2024

(65) Prior Publication Data

US 2026/0040193 A1 Feb. 5, 2026

(51) Int. Cl.
*H04W 48/16* (2009.01)
*H04L 41/122* (2022.01)
*H04W 84/12* (2009.01)

(52) U.S. Cl.
CPC ........... *H04W 48/16* (2013.01); *H04L 41/122* (2022.05); *H04W 84/12* (2013.01)

(58) Field of Classification Search
CPC ..... H04W 48/16; H04W 48/12; H04W 84/12; H04L 41/122
See application file for complete search history.

(56) References Cited

U.S. PATENT DOCUMENTS

2018/0199271 A1* 7/2018 Viger .................... H04W 48/12
2019/0132724 A1* 5/2019 Asterjadhi ............ H04W 8/005
2022/0330136 A1* 10/2022 Siraj ..................... H04W 48/12
2025/0168753 A1* 5/2025 Chirreddy ............ H04W 48/20

* cited by examiner

*Primary Examiner* — Farid Seyedvosoghi
(74) *Attorney, Agent, or Firm* — Hewlett Packard Enterprise Patent Department

(57) ABSTRACT

A method for transmitting beacon frames and Fast Initial Link Setup (FILS) frames. The method comprises obtaining, by an access point (AP), first basic service set (BSS) information of a first virtual AP in a first multiple basic service set identifier (MBSSID) group and second BSS information of a second virtual AP in a second MBSSID group. The method further comprises determining that the first virtual AP and the second virtual AP belong to a same radio of the AP. The method further comprises generating third BSS information based on the second BSS information. The method further comprises generating a reduced neighbor report (RNR) information element (IE) based on the third BSS information. The method further comprises generating a target frame based on the RNR IE and the first BSS information. In addition, the method further comprises transmitting the target frame to a station.

20 Claims, 7 Drawing Sheets

OPTIMIZED FILS DISCOVERY AND BEACON SCHEME FOR MULTIPLE MBSSID GROUPS

BACKGROUND

Multiple Basic Service Set Identifier (MBSSID) group is a feature in Wi-Fi networks that allows a single physical access point (AP) to broadcast multiple (Service Set Identifiers (SSIDs). Each SSID may represent a different virtual network, enabling the segmentation of network services and user groups.

Fast Initial Link Setup (FILS) is a feature designed to reduce the time required to connect to a Wi-Fi network, particularly in dense environments such as stadiums, airports, and shopping malls. FILS may improve the efficiency of initial link setup and authentication processes.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

In Wi-Fi 6E, MBSSID feature is introduced to reduce beacon frames in the air. Multiple virtual APs on a same radio of an AP may be organized into multiple MBSSID groups. For example, a first MBSSID group may comprise a first virtual AP and a second virtual AP, where the first virtual AP is a transmitted (TX) virtual AP of the first MBSSID group. A second MBSSID group may comprise a third virtual AP and a fourth virtual AP, where the third virtual AP is a TX virtual AP of the second MBSSID group. During a target beacon transmission time (TBTT), the first virtual AP may transmit one beacon frame and four FILS frames and the second virtual AP may transmit one beacon frame and four FILS frames as well. In other words, during the TBTT, ten frames need to be transmitted on the radio, which consumes channel resources. When the number of MBSSID groups on the radio increases, more channel resources are consumed.

For example, in a deployment with 16 virtual APs grouped into 4 MBSSID groups, an AP may send up to 16 FILS frames and 4 beacons in 100 time units (TUs), which significantly consumes air resources. This situation worsens in high-density deployments with more neighboring APs on the same channel that can hear each other. Therefore, it is necessary to optimize the beacon and FILS discovery scheme for multiple MBSSID groups.

Therefore, the implementations of the present disclosure provide a scheme of transmitting beacon frames and FILS frames. The scheme of the present disclosure may use a reduced neighbor report (RNR) information element (IE) in a FILS frame (or an RNR IE in a beacon frame in some implementations) to carry BSS information of virtual APs in other MBSSID groups. For example, the AP may obtain BSS information of the third virtual AP and BSS information of the fourth virtual AP. Then, the AP may generate a FILS frame to be transmitted by the first virtual AP, where the RNR IE in the FILS frame comprises the BSS information of the third virtual AP and the BSS information of the fourth virtual AP. The first virtual AP may broadcast the FILS frame comprising BSS information of the virtual APs in the first MBSSID group and the second MBSSID group, while the third virtual AP no longer needs to broadcast FILS frames.

In this way, the number of transmitted FILS frames can be reduced, thereby the channel utilization can be reduced. Furthermore, this scheme reuses the existing RNR IE to carry additional BSS information, thereby stations can support this scheme without additional modification.

Figure 1:
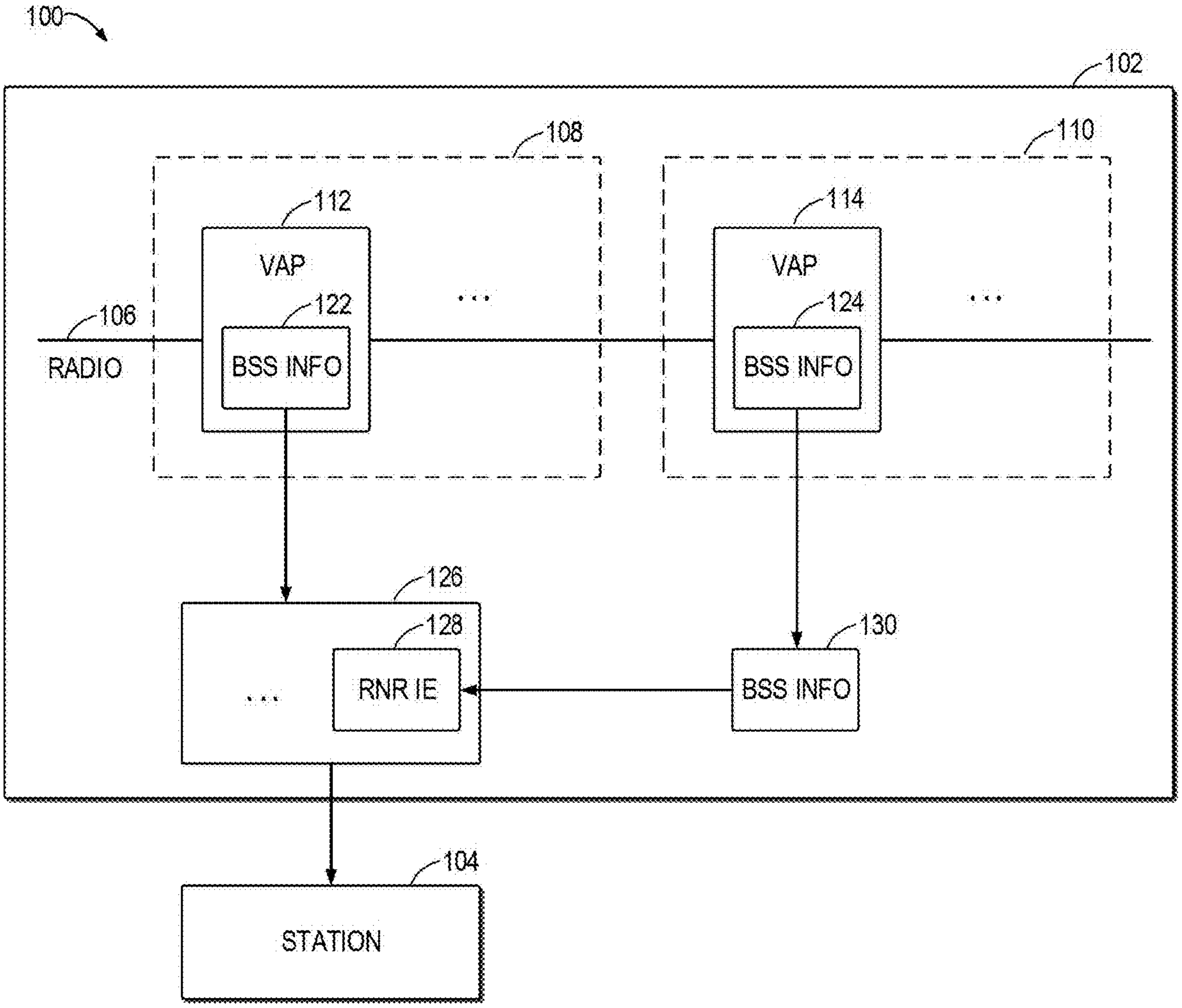
FIG. 1 illustrates an example environment in which example implementations of the present disclosure may be implemented.

FIG. 1 illustrates an example environment 100 in which example implementations of the present disclosure may be implemented. As shown in FIG. 1, the environment 100 includes an AP 102 and a station 104. The AP 102 includes a virtual AP 112 and a virtual AP 114, where the virtual AP 112 is a transmitted virtual AP of an MBSSID group 108, the virtual AP 114 is a transmitted virtual AP of an MBSSID group 110, and the MBSSID group 108 and the MBSSID group 110 belong to a same physical radio 106. The radio 106 is responsible for the fundamental task of transmitting and receiving wireless signals, operating on specific frequency bands like 2.4 GHz, 5 GHZ, or 6 GHz. The virtual APs 112 and 114 may allow the radio 106 to support multiple wireless networks (i.e., SSIDs) simultaneously, each with its own unique set of configurations and policies. In addition, the AP 102 may also include at least one processor, a memory, at least one antenna, an Ethernet interface, a management interface, and a power interface, etc.

In some implementations, the MBSSID group 108 (or the MBSSID group 110) may include one or more non-transmitted virtual APs. In these implementations, the virtual AP 112 may aggregate BSS information from itself and all the non-transmitted virtual APs in the MBSSID group 108 into a single beacon frame or a single FILS frame. Then, the virtual AP 112 may periodically transmit the aggregated beacon frame or FILS frame, allowing clients within the coverage area to discover and connect to any of the virtual APs in the MBSSID group 108.

In the environment 100, beacon frames and FILS frames may be transmitted at regular intervals. For example, beacon frames may be transmitted every 100 TUs (i.e., a TBTT period) to announce the presence of the AP 102 and provide necessary connection information. FILS frames may be transmitted more frequently to enable quick authentication and association. For example, during a TBTT period (e.g., 100 TUs), multiple FILS frames (e.g., four FILS frames) may be transmitted at a FILS discovery interval (e.g., 20 TUs) after a beacon frame is transmitted. Therefore, two beacon frames and eight FILS frames may be transmitted by the AP 112 and the AP 114 within a TBTT period in the environment 100. Because the APs 112 and 114 belong to the same radio 106, these beacon frames and FILS frames can only be transmitted serially and not in parallel.

In order to save network resources, the AP 102 may leverage the RNR IE in the beacon frame or the FILS frame to reduce the number of frames to be transmitted. An RNR IE is a component of beacon frames or FILS frames that helps improve the efficiency of network discovery and roaming processes. For example, the RNR IE may provide information about neighboring APs operating on different channels or bands. This can help client devices quickly discover and evaluate networks without scanning all channels.

In the environment 100, the AP 102 may use the RNR IE to carry BSS information of virtual APs belonging to other MBSSID groups. As shown in FIG. 1, the AP 102 may generate a target frame 126 for the virtual AP 112, where the target frame 126 may be a beacon frame or a FILS frame, and the target frame 126 may include an RNR IE 128. The target frame 126 may include BSS information 122 of the virtual AP 112. In addition, the RNR IE 128 may include BSS information 130. The BSS information 130 may be generated based on BSS information 124 of the virtual AP 114. For example, the BSS information 130 may be a summary of the BSS information 124, including a part of the BSS information 124. Therefore, the BSS information 122 of the virtual AP 112 and the BSS information 130 of the virtual AP 114 can be included in a single frame, i.e., the target frame 126. Then, the target frame 126 may be transmitted to the station 104, such that the station 104 can discover and connect to any of the virtual APs in the MBSSID group 108 and the MBSSID group 110.

In this way, the BSS information of the virtual APs in MBSSID groups other than the MBSSID group 108 can be transmitted by the virtual AP 112. Thus, the number of FILS frames transmitted by these virtual APs in other MBSSID groups can be reduced, thereby the network resources can be saved. In addition, the AP 102 reuses the existing RNR IE 128 to carry additional BSS information without introducing new features, thereby stations can support this scheme without additional modification.

Figure 2:
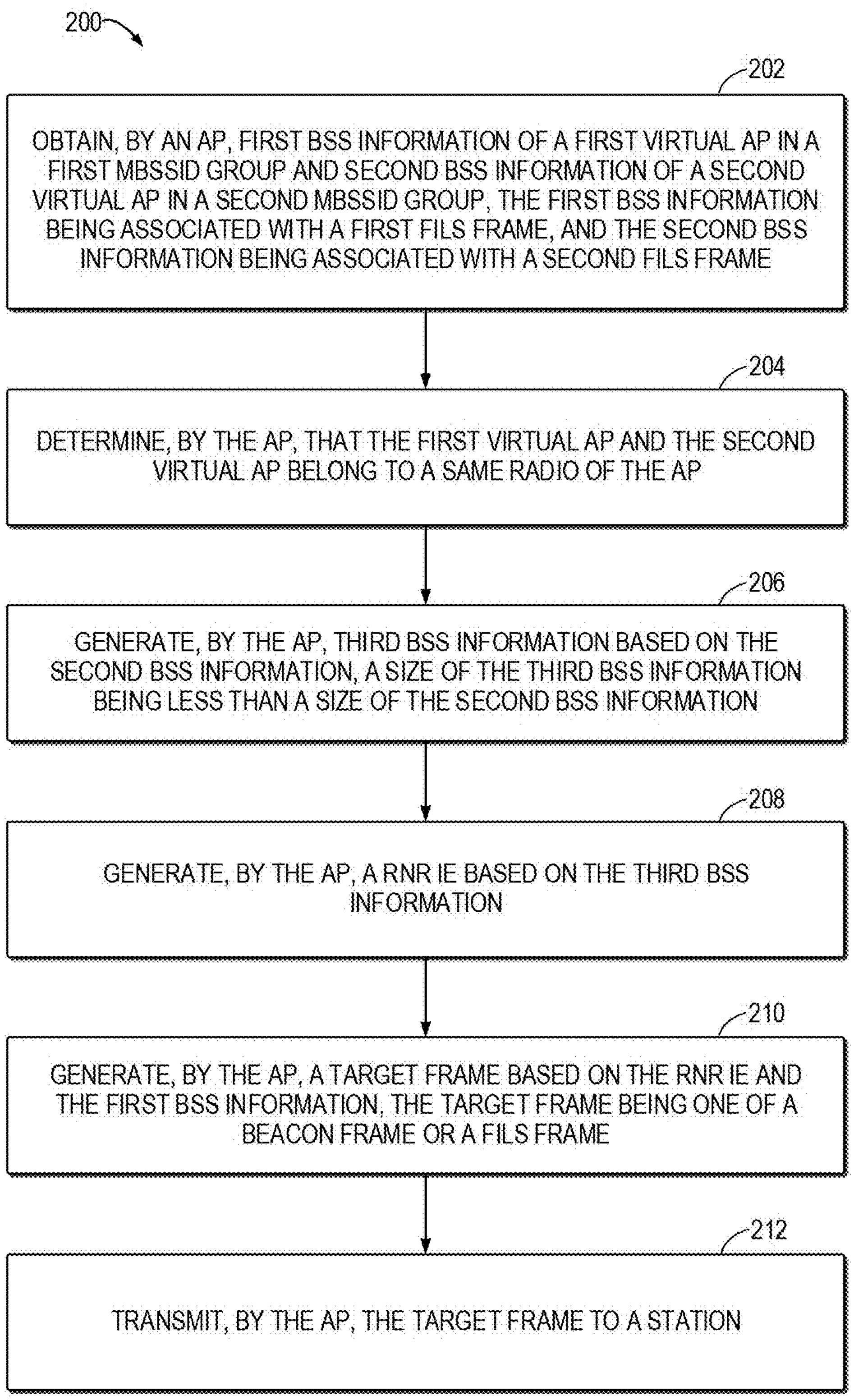
FIG. 2 shows a flow chart illustrating a method of transmitting beacon frames and FILS frames according to the implementations of the present disclosure.

FIG. 2 shows a flow chart illustrating a method 200 of transmitting beacon frames and FILS frames according to the implementations of the present disclosure. The method 200 may be implemented by, for example, the AP 102 in FIG. 1. As shown in FIG. 2, at block 202, an AP may obtain the first BSS information of a first virtual AP in a first MBSSID group and second BSS information of a second virtual AP in a second MBSSID group, where the first BSS information is associated with a first FILS frame, and the second BSS information is associated with a second FILS frame. For example, in the environment 100, as shown in FIG. 1, the AP 102 may obtain the BSS information 122 to be transmitted in a FILS frame by the virtual AP 112 belonging to the MBSSID group 108. Furthermore, the AP 102 may obtain the BSS information 124 to be transmitted in another FILS frame by the virtual AP 114 belonging to the MBSSID group 110.

At block 204, the AP may determine that the first virtual AP and the second virtual AP belong to a same radio as the AP. For example, in the environment 100, as shown in FIG. 1, the AP 102 may determine that both the virtual AP 112 and the virtual AP 114 belong to a same radio (i.e., the radio 106). Because the virtual APs 112 and 114 belong to the same radio, their FILS frames cannot be transmitted in parallel, such that reducing the number of FILS frames to be transmitted can save the network resources significantly.

At block 206, the AP may generate third BSS information based on the second BSS information, where a size of the third BSS information being less than a size of the second BSS information. For example, in the environment 100, as shown in FIG. 1, the AP 102 may generate the BSS information 130 based on the BSS information 124, where a size of the BSS information 130 is less than a size of the BSS information 124. In order to reuse the existing RNR IE in a beacon frame or a FILS frame to carry the BSS information of the virtual AP 114, the part of the BSS information 124 that cannot be filled into the RNR IE may be discarded. Therefore, the BSS information 130 may be a summary of the BSS information 124.

At block 208, the AP may generate an RNR IE based on the third BSS information. For example, in the environment 100, as shown in FIG. 1, the AP 102 may generate the RNR IE 128 based on the BSS information 130. For example, the RNR IE 128 may include neighbor AP information fields, where a neighbor AP information field may include a set of TBTT information fields and each TBTT information field includes BSSID, short service set identifier (SSID), and BSS parameters. The AP 102 may set the BSSID and the short SSID based on the BSS information 130.

At block 210, the AP may generate a target frame based on the RNR IE and the first BSS information, where the target frame is one of a beacon frame or a FILS frame. For example, in the environment 100, as shown in FIG. 1, the AP 102 may generate the target frame 126 based on the RNR IE 128 and the BSS information 122. The target frame 126 may be a beacon frame or a FILS frame of the virtual AP 112. Thus, the target frame 126 should include the BSS information of the virtual AP 112 itself. Furthermore, both the format of a beacon frame or a format of a FILS frame include an RNR IE, such that the generated target frame 126 may include the RNR IE 128. Therefore, both the BSS information 122 of the virtual AP 112 and the BSS information 130 of the virtual AP 114 can be included in the target frame 126.

At block 212, the AP may transmit the target frame to a station. For example, in the environment 100, as shown in FIG. 1, the AP 102 may transmit the target frame 126 to the station 104, such that the station 104 can discover and connect to any of the virtual APs in the MBSSID group 108 and the MBSSID group 110.

In this way, the BSS information of the virtual APs in the second MBSSID group can be transmitted by the first virtual AP. Thus, the number of FILS frames transmitted by the second virtual AP can be reduced, thereby the network resources can be saved. In addition, the AP may reuse the existing RNR IE in a beacon frame or a FILS frame to carry additional BSS information without introducing new features, thereby stations can support this scheme without additional modification.

Figure 3:
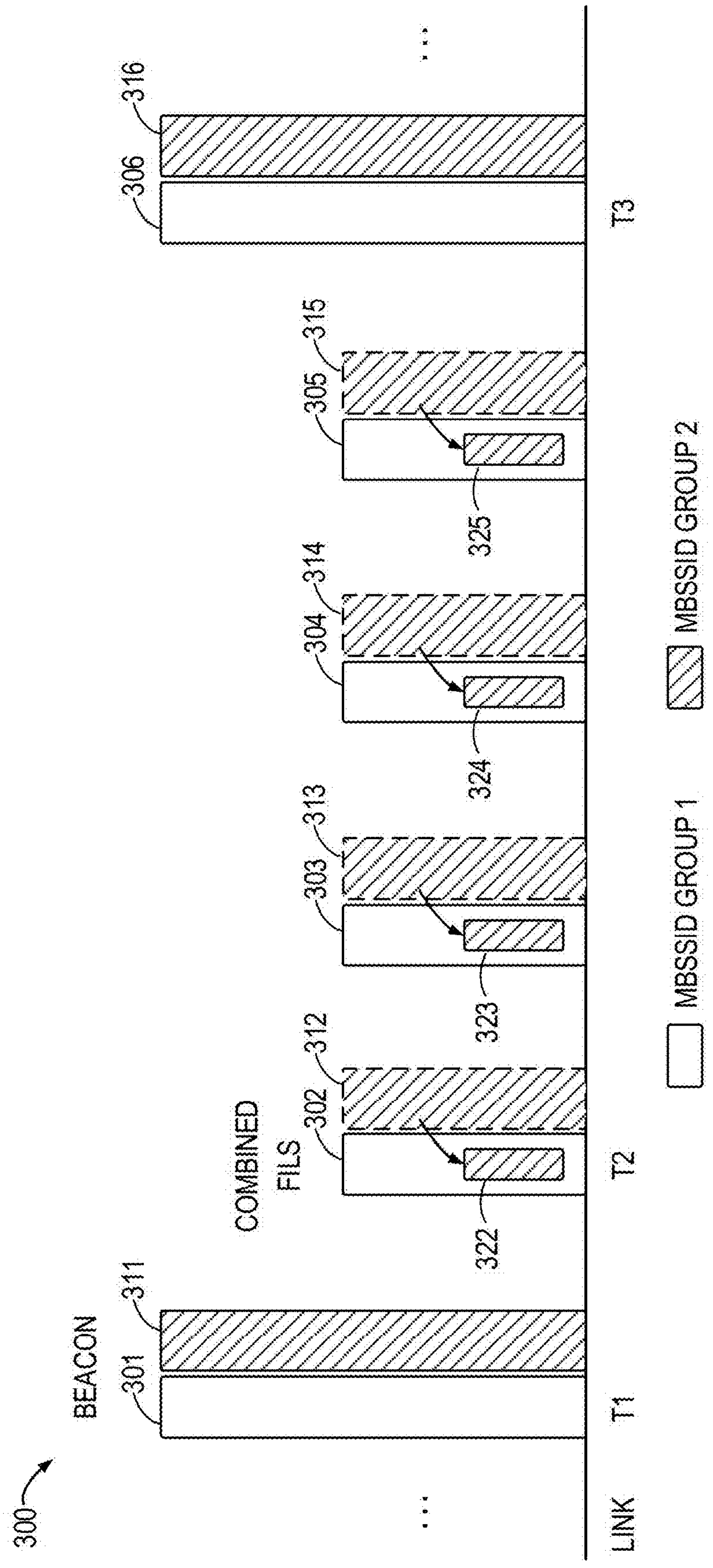
FIG. 3 shows a schematic diagram illustrating an example of combining two FILS frames from two MBSSID groups according to the implementations of the present disclosure.

FIG. 3 shows a schematic diagram illustrating an example 300 of combining two FILS frames from two MBSSID groups according to the implementations of the present disclosure. As shown in FIG. 3, the example 300 includes an MBSSID group 1 and an MBSSID group 2, where these two MBSSID groups belong to a same link (i.e., a same radio). In the example 300, a transmitted virtual AP of the MBSSID group 1 may transmit a beacon frame 301 at T1. The beacon frame 301 may include BSS information of all virtual APs (i.e., including a transmitted virtual AP and non-transmitted virtual APs) in the MBSSID group 1. After a TBTT period (e.g., 100 TUs), the transmitted virtual AP of the MBSSID group 1 may transmit another beacon frame at T3. In other words, the interval between T1 and T3 may be 100 TUs.

In order to improve the efficiency of initial link setup and authentication processes, the transmitted virtual AP of the MBSSID group 1 may transmit multiple FILS frames at a FILS discovery interval (e.g., 20 TUs) within the TBTT period. For example, the transmitted virtual AP of the MBSSID group 1 may transmit a FILS frame 302 at T2, i.e., 20 TUs after T1, and transmit FILS frames 303, 304, and 305 every 20 TUs.

In the example 300, a transmitted virtual AP of the MBSSID group 2 may transmit a beacon frame 311 after the transmission of the beacon frame 301 in a burst mode. In the burst mode, an interval between the transmission of the beacon frame 301 and the transmission of the beacon frame 311 may be less than an interval threshold. After a TBTT period, the transmitted virtual AP of the MBSSID group 2 may transmit a beacon frame 316 after the transmission of the beacon frame 306 in the burst mode.

In traditional schemes, the transmitted virtual AP of the MBSSID group 2 may also transmit multiple FILS frames at the FILS discovery interval. For example, the transmitted virtual AP of the MBSSID group 2 may transmit FILS frames 312, 313, 314, and 315 every 20 TUs. Therefore, in this TBTT period, eight FILS frames may be transmitted on the radio. In a case that the AP includes four MBSSID groups, sixteen FILS frames may be transmitted by four transmitted virtual APs, increasing the consumption of the network resources.

In order to reduce the number of FILS frames to be transmitted, in the example 300, the AP may combine the FILS frames from the MBSSID group 2 with the FILS frames from the MBSSID group 1. For example, the AP may generate a summary of the BSS information in the FILS frame 312. Then, the AP may fill the summary of the BSS information into an RNR IE 322 of the FILS frame 302. After combining the FILS frame 312 with the FILS frame 302, if a station received the FILS frame 302, it may obtain the BSS information of all virtual APs in the MBSSID group 1 and the MBSSID group 2. Thus, the FILS frame 312 may be discarded. Similarly, the AP may combine the FILS frames 313 with the FILS frame 303 by aggregating the BSS information in the FILS frames 313 into an RNR IE 323 of the FILS frame 303, combine the FILS frames 314 with the FILS frame 304 by aggregating the BSS information in the FILS frames 314 into an RNR IE 324 of the FILS frame 304, and combine the FILS frames 315 with the FILS frame 305 by aggregating the BSS information in the FILS frames 315 into an RNR IE 325 of the FILS frame 305. Therefore, the number of transmitted FILS frames can be reduced from eight (or sixteen in the case that the AP includes four MBSSID groups on the radio) to four, thereby the network resources can be saved.

In some implementations, the MBSSID group 2 may include one transmitted virtual APs and multiple non-transmitted virtual APs. For example, in a case that the MBSSID group 2 includes one transmitted virtual APs and three non-transmitted virtual APs, the FILS frame 312 may include BSS information of all these four virtual APs. As described above, an RNR IE may include a set of TBTT information fields. Therefore, the AP may use four TBTT information fields in the RNR IE 322 to carry the BSS information of these four virtual APs in the FILS frame 312.

For example, in a particular TBTT information field of the RNR IE 322, a BSSID field may be set to a BSSID of a corresponding virtual AP in the MBSSID group 2. The BSSID can uniquely identify each VAP. Even though multiple virtual APs are broadcast from the same physical radio, each one has a distinct BSSID to distinguish it from the other virtual APs. In the particular TBTT information field of the RNR IE 322, a short SSID field may be set to a short SSID of the corresponding virtual AP in the MBSSID group 2. The short SSID is a truncated or hashed version of the full SSID of the virtual AP. The short SSID can be used for efficient network discovery and identification in dense environments.

Furthermore, the TBTT information field includes BSS parameters field, where the BSS parameters field includes a transmitted BSSID bit and a co-located AP bit. If the virtual AP corresponding to the particular TBTT information field is a transmitted virtual AP, the transmitted BSSID bit may be set to true; otherwise, the transmitted BSSID bit may be set to false. Therefore, the station may obtain the type of the virtual AP from the RNR IE 322. In addition, the co-located AP bit may be set to true for each virtual AP in the MBSSID group 2. Therefore, the station may be aware that this virtual AP belongs to the current AP device but not a neighbor AP device.

In this way, by utilizing the RNR IE 322, 323, 324, and 325, all the BSS information of the virtual APs in the MBSSID group 2 can be aggregated into the FILS frames 302, 303, 304, and 305. Therefore, the FILS frames 312, 313, 314, and 315 can be discarded, thereby the number of FILS frames to be transmitted can be reduced and the network resources can be saved. Furthermore, by utilizing the set of TBTT information fields in the RNR IE, the BSS information of all virtual APs in other MBSSID groups can be carried in one FILS frame. In addition, by setting the BSS parameters in the TBTT information field, the station can process the received FILS frame in the correct way.

Figure 4:
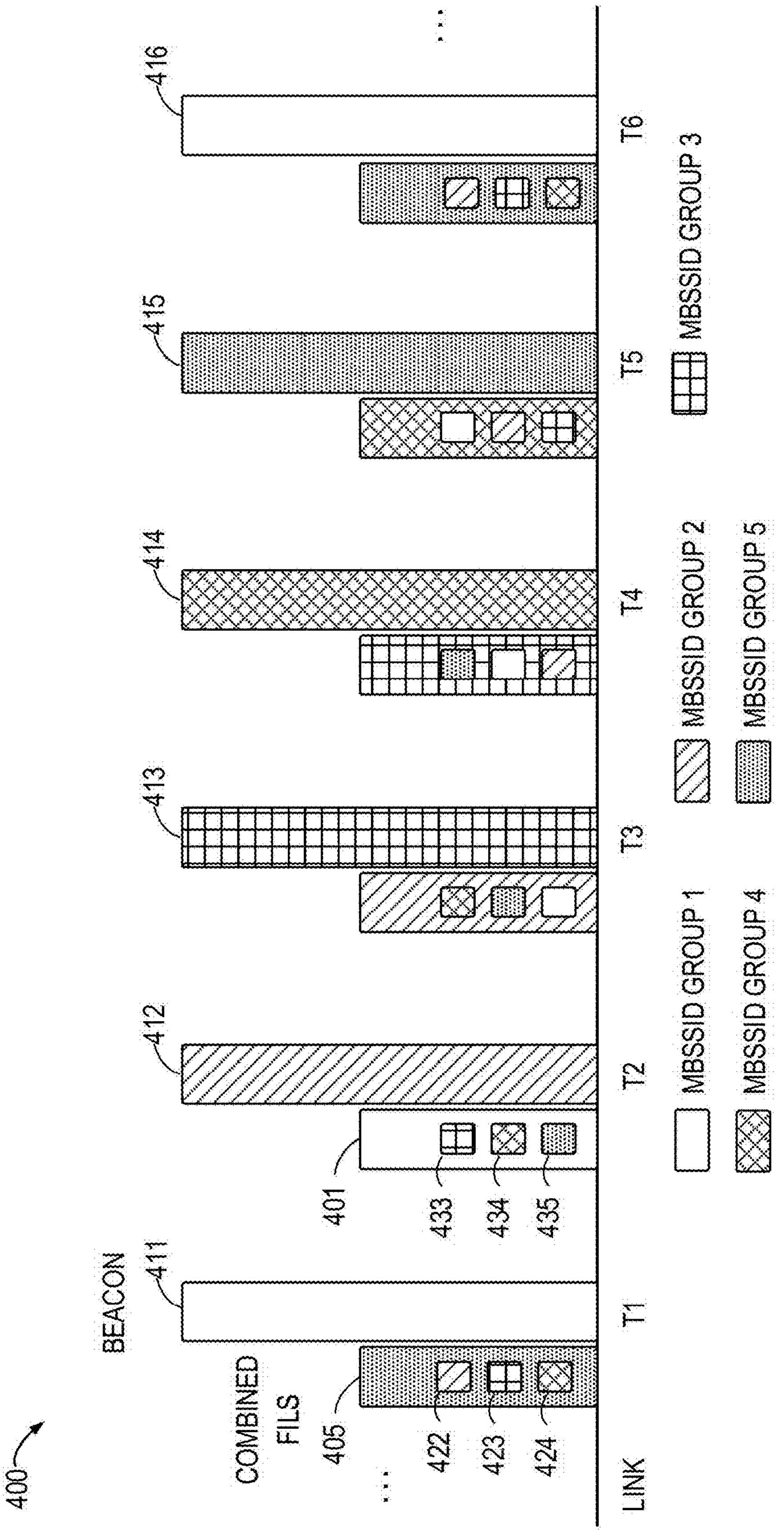
FIG. 4 shows a schematic diagram illustrating an example of combining multiple FILS frames from multiple MBSSID groups and bonding the combined FILS frame with a beacon frame according to the implementations of the present disclosure.

In some implementations, in order to improve the fairness and performance of the network, the AP may transmit the beacon frames from multiple MBSSID groups in a stagger mode instead of a burst mode. Furthermore, the beacon frames and the FILS frames from the multiple MBSSID groups may be transmitted in a balanced manner. In addition, these beacon frames may be transmitted at the FILS discovery interval. In some implementations, the AP may bond a beacon frame from an MBSSID group with a FILS frame from another MBSSID group. Then, the AP may transmit the beacon frame and the bonded FILS frame together. In other words, an interval between the transmission of the beacon frame and the transmission of the bonded FILS frame may be less than an interval threshold. FIG. 4 shows a schematic diagram illustrating an example 400 of combining multiple FILS frames from multiple MBSSID groups and bonding the combined FILS frame with a beacon frame according to the implementations of the present disclosure.

As shown in FIG. 4, the example 400 includes MBSSID groups 1, 2, 3, 4, and 5, where these five MBSSID groups belong to a same link (i.e., a same radio). In the example 400, a transmitted virtual AP of the MBSSID group 1 may transmit a beacon frame 411 at T1. The beacon frame 411 may include BSS information of all virtual APs in the MBSSID group 1. After a TBTT period, the transmitted virtual AP of the MBSSID group 1 may transmit another beacon frame 416 at T6. For example, the interval between T1 and T6 may be 100 TUs.

In the burst mode, the AP may transmit beacon frames from the other MBSSID groups at T1 and T6 as well. At the time between T1 and T6, the station may obtain the BSS information of the virtual APs from received FILS frames. In this situation, the BSS information of some virtual APs is obtained from the RNR IEs of the received FILS frames. As described above, the BSS information in the RNR IE is a summary of BSS information, thus the information in the RNR IE is less than the information in the FILS frame. Furthermore, because the FILS frame is used for fast initial setup, the FILS frame contains less information than the beacon frame. Therefore, in order to improve the fairness of the network, in the example 400, the beacon frames from the five MBSSID groups may be transmitted in a stagger mode.

As shown in FIG. 4, in the example 400, the beacon frames from the five MBSSID groups may be transmitted at the FILS discovery interval (e.g., 20 TUs). For example, the interval between T1 and T2, the interval between T2 and T3, the interval between T3 and T4, and the interval between T4 and T5 are 20 TUs. A beacon frame 412 from the MBSSID group 2 may be transmitted at T2, a beacon frame 413 from the MBSSID group 3 may be transmitted at T3, a beacon frame 414 from the MBSSID group 4 may be transmitted at T4, and a beacon frame 415 from the MBSSID group 5 may be transmitted at T5.

In the example 400, during the TBTT period (i.e., between T1 and T6), only one FILS frame may be transmitted for each MBSSID group. Furthermore, this FILS frame may be bonded with a beacon frame from another MBSSID group. In addition, the RNR IE of each FILS frame may contain BSS information of virtual APs in all the other MBSSID groups excluding the MBSSID group corresponding to the bonded beacon frame. In the example 400, each FILS frame may be transmitted with the bonded beacon frame together. In other words, the interval between the transmission of the FILS frame and the transmission of the bonded beacon frame may be less than an interval threshold.

As shown in FIG. 4, the FILS frame 405 from the MBSSID group 5 is bonded with the beacon frame 411 from the MBSSID group 1. The transmitting interval between the FILS frame 405 and the beacon frame 411 is less than the interval threshold. A part of the FILS frame 405 except the RNR IE contains the BSS information of the virtual APs in the MBSSID group 5. Furthermore, the RNR IE of the FILS frame 405 contains BSS information 422 of the MBSSID group 2, BSS information 423 of the MBSSID group 3, and BSS information 424 of the MBSSID group 4. In this way, the FILS frame 405 and the beacon frame 411 may be received by a station at T1, and the BSS information of all the virtual APs in the five MBSSID groups can be obtained through only two frames, rather than five frames, by the station.

At T2, the FILS frame 401 from the MBSSID group 1 is bonded with the beacon frame 412 from the MBSSID group 2. The transmitting interval between the FILS frame 401 and the beacon frame 412 is also less than the interval threshold. A part of the FILS frame 401 except the RNR IE contains the BSS information of the virtual APs in the MBSSID group 1. Furthermore, the RNR IE of the FILS frame 401 contains BSS information 433 of the MBSSID group 3, BSS information 434 of the MBSSID group 4, and BSS information 435 of the MBSSID group 5. In addition, the beacon frame 412 contains BSS information of the MBSSID group 2.

In traditional schemes, during the TBTT period, five beacon frames from the five MBSSID groups are transmitted in the burst mode at T1. Furthermore, five FILS frames from the five MBSSID groups are transmitted at T1, T2, T3, and T4 respectively. Therefore, a total number of twenty-five frames are transmitted within each TBTT period. In the example 5, only two frames (including one beacon frame and one FILS frame) are transmitted at each timeframe, and a total number of ten frames are transmitted within each TBTT period. In this way, the number of frames to be transmitted at the same time can be reduced, thereby the instantaneous utilization of air interfaces can be reduced. Furthermore, the total number of frames to be transmitted can be reduced, thereby the network resources can be saved. In addition, within a TBTT period, the FILS frame and beacon frame from each group can be transmitted, thereby the fairness and performance of the network can be increased.

It should be noted that although the example 400 includes five MBSSID groups, but it does not intend to limit the number of MBSSID groups. Other examples may include fewer or more MBSSID groups. The beacon frames and FILS frames may be scheduled in a balanced manner. For example, if there are three MBSSID groups, two of the MBSSID groups may transmit two beacon frames (or FILS frames) and the remaining one MBSSID group may transmit only one beacon frame (or FILS frame) within a TBTT period. If there are four MBSSID groups, one of the MBSSID groups may transmit two beacon frames (or FILS frames) and the remaining three MBSSID groups may transmit only one beacon frame (or FILS frame).

Figure 5:
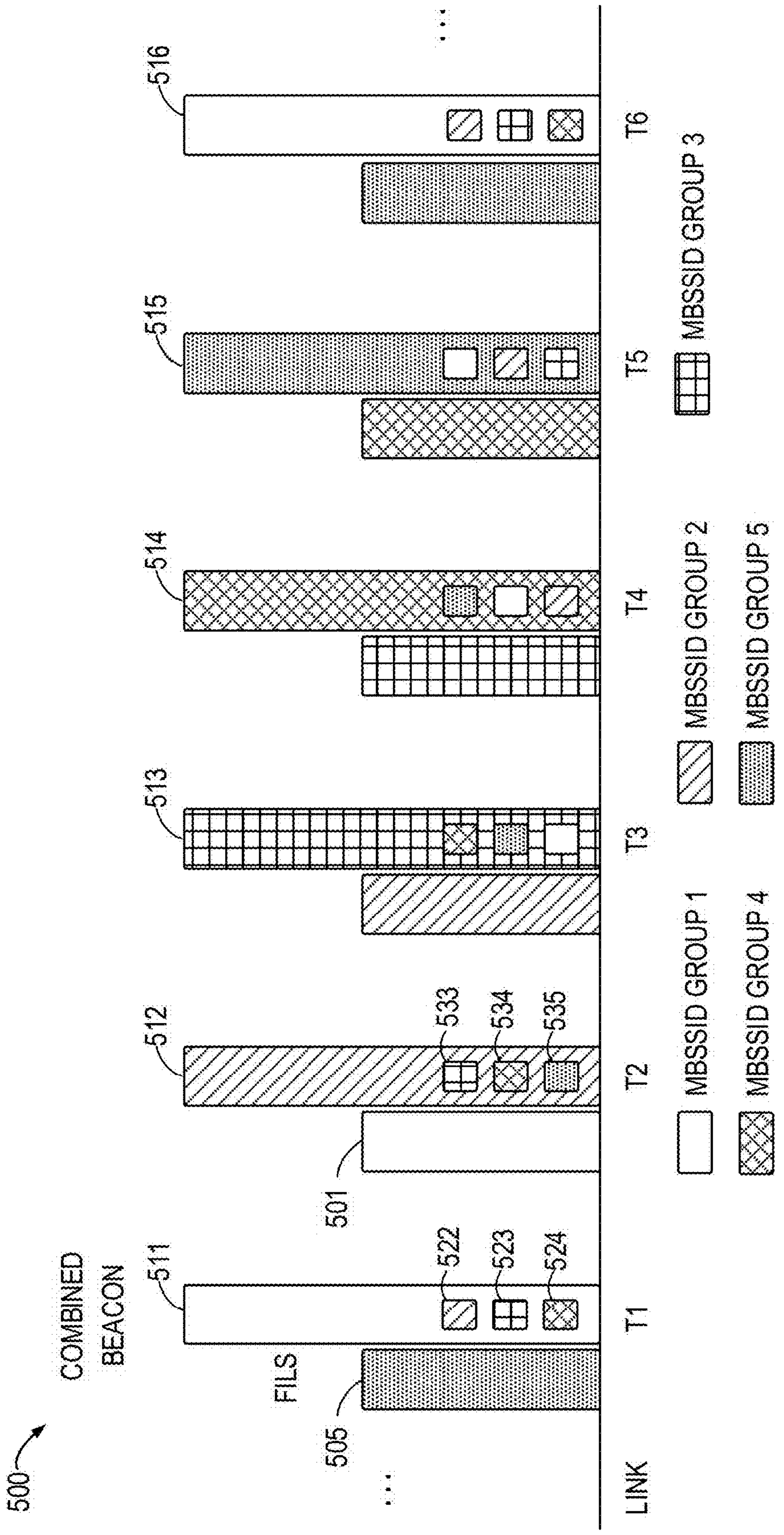
FIG. 5 shows a schematic diagram illustrating an example of combining multiple FILS frames from multiple MBSSID groups with a beacon frame and bonding the combined beacon frame with a FILS frame according to the implementations of the present disclosure.

In some implementations, the FILS frame may also be combined with a beacon frame. In these implementations, the BSS information of the virtual APs may be aggregated into an RNR IE of a beacon frame. FIG. 5 shows a schematic diagram illustrating an example 500 of combining multiple FILS frames from multiple MBSSID groups with a beacon frame and bonding the combined beacon frame with a FILS frame according to the implementations of the present disclosure.

As shown in FIG. 5, the example 500 includes MBSSID groups 1, 2, 3, 4, and 5, where these five MBSSID groups belong to a same link (i.e., a same radio). In the example 500, in order to improve the fairness of the network, the beacon frames from these MBSSID groups may be transmitted in the stagger mode and in a balanced manner. As shown in FIG. 5, the period from T1 to T6 is a TBTT period (e.g., 100 TUs). A beacon frame 511 from the MBSSID group 1 may be transmitted at T1, and a beacon frame 516 from the MBSSID group 1 may be transmitted at T6. The beacon frame 511 may include BSS information of all virtual APs in the MBSSID group 1.

In the stagger mode, the beacon frames and the FILS frames from multiple MBSSID groups may be transmitted in a balanced manner. During the TBTT period, the beacon frames from the five MBSSID groups may be transmitted at the FILS discovery interval (e.g., 20 TUs). For example, the interval between T1 and T2, the interval between T2 and T3, the interval between T3 and T4, and the interval between T4 and T5 are 20 TUs. A beacon frame 512 from the MBSSID group 2 may be transmitted at T2, a beacon frame 513 from the MBSSID group 3 may be transmitted at T3, a beacon frame 514 from the MBSSID group 4 may be transmitted at T4, and a beacon frame 515 from the MBSSID group 5 may be transmitted at T5.

In the example 500, during the TBTT period, only one FILS frame may be transmitted for each MBSSID group.

Furthermore, this FILS frame may be bonded with a beacon frame from another MBSSID group. Compared to the example 400, the example 500 may utilize the RNR IEs in the beacon frames instead of FILS frames to carry the BSS information from other MBSSID groups. In the example 500, the RNR IE of each beacon frame may contain BSS information of virtual APs in all the other MBSSID groups excluding the MBSSID group corresponding to the bonded FILS frame. Furthermore, each FILS frame may be transmitted with the bonded beacon frame together. In other words, the interval between the transmission of the FILS frame and the transmission of the bonded beacon frame may be less than an interval threshold.

As shown in FIG. 5, the FILS frame 505 from the MBSSID group 5 is bonded with the beacon frame 511 from the MBSSID group 1. The transmitting interval between the FILS frame 505 and the beacon frame 511 is less than the interval threshold. A part of the beacon frame 511 except the RNR IE contains the BSS information of the virtual APs in the MBSSID group 1. Furthermore, the RNR IE of the beacon frame 511 contains BSS information 522 of the MBSSID group 2, BSS information 523 of the MBSSID group 3, and BSS information 524 of the MBSSID group 4. In this way, the beacon frame 511 and the FILS frame 505 may be received by a station at T1, and the BSS information of all the virtual APs in the five MBSSID groups can be obtained through only two frames, rather than five frames, by the station.

At T2, the FILS frame 501 from the MBSSID group 1 is bonded with the beacon frame 512 from the MBSSID group 2. The transmitting interval between the FILS frame 501 and the beacon frame 512 is also less than the interval threshold. A part of the beacon frame 512 except the RNR IE contains the BSS information of the virtual APs in the MBSSID group 2. Furthermore, the RNR IE of the beacon frame 512 contains BSS information 533 from the MBSSID group 3, BSS information 534 from the MBSSID group 4, and BSS information 535 from the MBSSID group 5. In addition, the FILS frame 501 contains BSS information of the MBSSID group 1.

In this way, the number of frames to be transmitted at same time can be reduced, thereby the instantaneous utilization of air interfaces can be reduced. Furthermore, the total number of frames to be transmitted can be reduced, thereby the network resources can be saved. In addition, within a TBTT period, the FILS frame and beacon frame from each group can be transmitted, thereby the fairness and performance of the network can be increased. Beacon frames are a well-established method for broadcasting BSS information and are widely supported by various client devices. Thus, compared to utilizing FILS frames to carry BSS information from other MBSSID groups (e.g., the example 400), utilizing beacon frames can improve the compatibility and stability across different devices and vendors.

Figure 6:
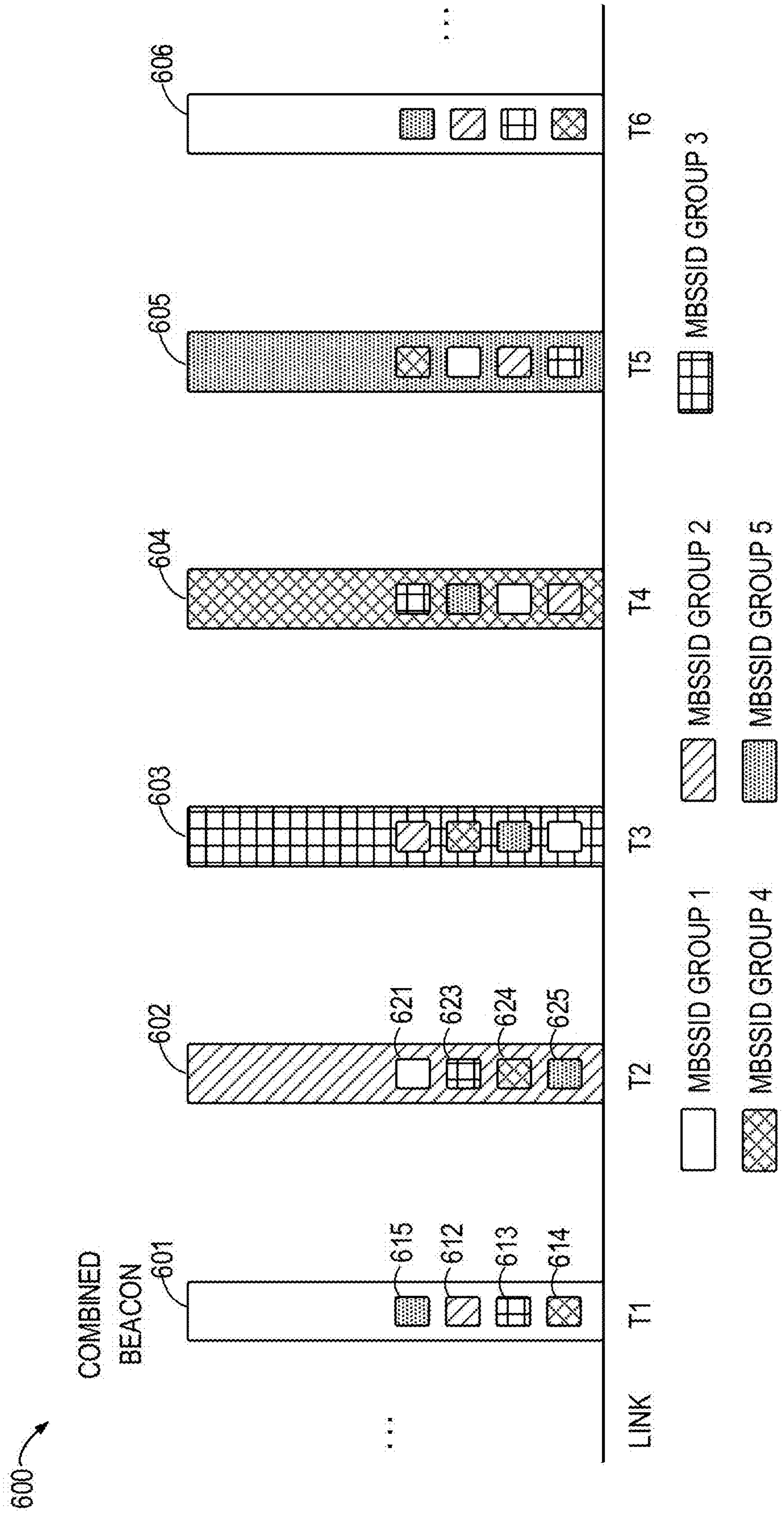
FIG. 6 shows a schematic diagram illustrating an example of combining multiple FILS frames from multiple MBSSID groups with a beacon frame and transmitting the beacon frame as a FILS frame according to the implementations of the present disclosure.

In some implementations, the beacon frames from multiple MBSSID groups may be transmitted in the stagger mode and in a balanced manner. For example, the beacon frames from the multiple MBSSID groups may be transmitted at a FILS discovery interval. In other words, the beacon frames from the multiple MBSSID groups may play the role of FILS frames. Furthermore, the RNR IE of each beacon frame from the MBSSID groups may include BSS information of virtual APs in all the other MBSSID groups. FIG. 6 shows a schematic diagram illustrating an example 600 of combining multiple FILS frames from multiple MBSSID groups with a beacon frame and transmitting the beacon frame as a FILS frame according to the implementations of the present disclosure.

As shown in FIG. 6, the example 600 includes MBSSID groups 1, 2, 3, 4, and 5, where these MBSSID groups belong to a same link (i.e., a same radio). In the example 600, the beacon frames from these MBSSID groups may be transmitted in the stagger mode and in a balanced manner. As shown in FIG. 6, the period from T1 to T6 is a TBTT period (e.g., 100 TUs). A beacon frame 601 from the MBSSID group 1 may be transmitted at T1, and a beacon frame 606 from the MBSSID group 1 may be transmitted at T6. The beacon frame 601 may include BSS information of all virtual APs in the MBSSID group 1.

In the example 600, the RNR IE of the beacon frame 601 may be used to carry the BSS information of all virtual APs in the other MBSSID groups (i.e., MBSSID groups 2, 3, 4, and 5). As shown in FIG. 6, the RNR IE of the beacon frame 601 contains BSS information 612 of the MBSSID group 2, BSS information 613 of the MBSSID group 3, BSS information 614 of the MBSSID group 4, and BSS information 615 of the MBSSID group 5. Therefore, the beacon frame 601 may contain the BSS information of all virtual APs in the five MBSSID groups. In this way, at T1, a station may obtain information of all virtual APs in the five MBSSID groups through only one frame. Compared to the traditional schemes (i.e., five beacon frames being transmitted at T1), the number of frames transmitted at same time can be reduced, thereby the instantaneous utilization of air interfaces can be reduced.

During the TBTT period, the beacon frames from the five MBSSID groups may be transmitted at the FILS discovery interval (e.g., 20 TUs). For example, the interval between T1 and T2, the interval between T2 and T3, the interval between T3 and T4, and the interval between T4 and T5 are 20 TUs. A beacon frame 602 from the MBSSID group 2 may be transmitted at T2, a beacon frame 603 from the MBSSID group 3 may be transmitted at T3, a beacon frame 604 from the MBSSID group 4 may be transmitted at T4, and a beacon frame 605 from the MBSSID group 5 may be transmitted at T5.

As shown in FIG. 6, in the beacon frame 602, the part other than the RNR IE may carry the BSS information of virtual APs in the MBSSID group 2. Furthermore, the RNR IE of the beacon frame 602 may carry the BSS information of virtual APs in the other MBSSID groups. For example, the RNR IE of the beacon frame 602 may carry BSS information 621 of the MBSSID group 1, BSS information 623 of the MBSSID group 3, BSS information 624 of the MBSSID group 4, and BSS information 625 of the MBSSID group 5. Similarly, the RNR IE of the beacon frame 603, 604, or 605 may also carry the BSS information of the virtual APs in the other four MBSSID groups.

In this way, the beacon frames 602, 603, 604, and 605 from the other MBSSID groups can be used as the FILS frames of the MBSSID group 1. Therefore, all FILS frames can be regarded, such that the number of frames to be transmitted within the TBTT period is five. Compared to the schemes described in the examples 300, 400, and 500, the number of frames is further reduced, thereby the network resources can be saved.

In a case that the number of MBSSID groups is less than five, for example, the number of MBSSID groups is four, only four beacon frames can be transmitted within the TBTT period. That means no beacon frame can be transmitted at one of T1, T2, T3, T4, and T5. In this situation, the AP may generate a FILS frame for one of the four MBSSID groups to fill the vacant timeframe. Furthermore, the RNR IE of the generated FILS frame may include BSS information of virtual APs in the other three MBSSID groups.

For example, assuming that the MBSSID group 5 is removed from the example 600, the AP may generate a FILS frame for any one of the four MBSSID groups. For example, the AP may generate a FILS frame for the MBSSID group 2, where the RNR IE of the generated FILS frame includes the BSS information of the other three MBSSID groups. Then, the generated FILS frame may be transmitted at T5. Therefore, the frames can still be transmitted at the FILS discovery interval, and the number of frames within the TBTT period is five as well.

As described above, in the examples 400 and 500, FILS frames may be bonded with beacon frames. Furthermore, these frames may be transmitted in the stagger mode. However, in the example 600, FILS frames may be eliminated and the beacon frames from the other MBSSID groups may be used as the FILS frames. Each of these schemes has its own advantages.

For example, the FILS frames in the examples 400 and 500 can help devices quickly discover available networks, reducing the time taken to find and connect to a suitable virtual AP. Furthermore, the FILS frames can streamline the process of authenticating and associating with a network, making the process faster and more efficient. In addition, the FILS frames can facilitate quicker IP address assignment through Dynamic Host Configuration Protocol (DHCP), speeding up the overall process of joining a network.

In another aspect, the scheme described in the example 600 can transmit the least number of frames within the TBTT period by eliminating some of the FILS frames or all the FILS frames. Furthermore, the beacon frames can carry a wide range of information, including SSID, supported data rates, security settings, and other essential network parameters. This comprehensive data is crucial for client devices to make informed decisions about network connections.

In some implementations, the AP may select one of these schemes based on one or more of the current home channel utilization, an air traffic condition, the number of clients, or the number of virtual APs.

For example, the home channel utilization refers to the degree of occupancy or usage of the primary channel that an AP operates on. It measures how much of the available bandwidth is being used at any given time. High utilization indicates heavy traffic on the channel, leading to congestion and reduced performance. Therefore, if the current channel utilization is high, the scheme transmitting the least frames may be selected.

The air traffic conditions encompass the overall activity in the wireless spectrum within a particular area. The air traffic conditions include data transmissions, interference, and signals from other devices and networks operating in the same frequency band. High air traffic may result in interference, packet collisions, and reduced throughput. Therefore, if the current channel utilization is high, the scheme transmitting the least frames may be selected.

In some situations, if the AP is configured to prioritize advanced features of FILS and rapid BSS discovery, the scheme of bonding the FILS frames with the beacon frames may be selected. Therefore, the use of FILS frames can enhance both the discovery and connection processes.

Figure 7:
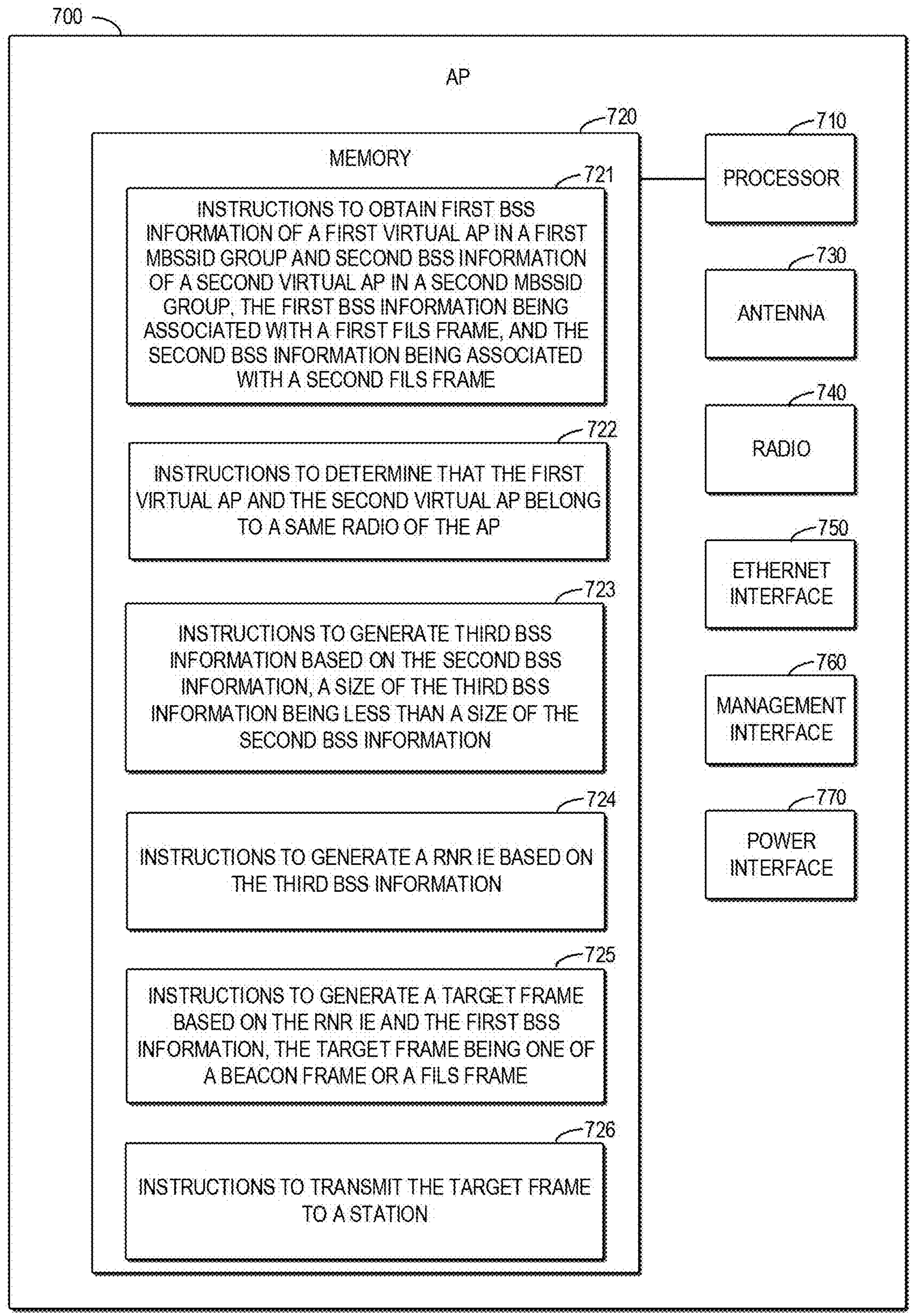
FIG. 7 shows a diagram illustrating an example AP according to the implementations of the present disclosure.

FIG. 7 shows a diagram illustrating an example AP 700 according to the implementations of the present disclosure. As shown in FIG. 7, the AP 700 comprises at least one processor 710, a memory 720 coupled to the at least one processor 710, at least one antenna 730, at least one radio 740, an Ethernet interface 750, a management interface 760 and a power interface 760. The memory 720 stores instructions 722, 724, 726, and 728 to cause the processor 710 to perform actions according to example implementations of the present disclosure.

As shown in FIG. 7, the memory 720 stores instructions 721 to obtain the first BSS information of a first virtual AP in a first MBSSID group and second BSS information of a second virtual AP in a second MBSSID group, where the first BSS information is associated with a first FILS frame, and the second BSS information is associated with a second FILS frame. The memory 720 further stores instructions 722 to determine that the first virtual AP and the second virtual AP belong to a same radio of the AP. The memory 720 further stores instructions 723 to generate third BSS information based on the second BSS information, where a size of the third BSS information is less than a size of the second BSS information. The memory 720 further stores instructions 724 to generate an RNR IE based on the third BSS information. The memory 720 further stores instructions 725 to generate a target frame based on the RNR IE and the first BSS information, where the target frame is one of a beacon frame or a FILS frame. In addition, the memory 720 further stores instructions 726 to transmit the target frame to a station.

The stored instructions and the functions that the instructions may perform can be understood with reference to implementations as described above. For brevity, the details of instructions 721, 722, 723, 724, 725, and 726 will not be discussed herein.

The at least one antenna 730 in the AP 700 is a crucial component that allows the AP 700 to communicate with wireless devices such as laptops, smartphones, and tablets. The primary function of the at least one antenna 730 may be to transmit and receive wireless signals, converting electrical signals into radio waves for outgoing communication and vice versa for incoming signals.

The at least one radio 740 in the AP 700 is responsible for wireless communication. The at least one radio 740 may handle the conversion of data between wired and wireless forms, making it possible for the AP 700 to transmit and receive data over the air. In a modulation process, the digital data from the wired network may be converted into radio waves for wireless transmission. In a demodulation process, incoming radio waves may be converted back into digital data that the AP 700 can process. The at least one radio 740 may operate on specific frequency bands, such as 2.4 GHz, 5 GHZ, or 6 GHz bands. The at least one radio 740 may ensure effective communication by selecting appropriate channels to minimize interference. The performance of the at least one radio 740 may be defined by various Wi-Fi standards, including 802.11a/b/g/n/ac/ax, with newer standards like Wi-Fi 6 and Wi-Fi 7 offering improved speed, efficiency, and capacity.

The Ethernet interface 750 in the AP 700 may be used for connecting the AP 700 to the local network, providing a bridge between the wired and wireless segments of the network. The AP 700 may connect to routers, switches, or directly to the internet through the Ethernet interface 750, enabling the wireless devices to communicate with other network resources and the broader internet. The Ethernet interface may support various speeds, including Fast Ethernet (e.g., 100 Mbps), Gigabit Ethernet (e.g., 1 Gbps), and even Multi-Gigabit Ethernet.

The management interface 760 in the AP 700 may allow network administrators to configure, monitor, and manage the settings and performance of the AP 700. The management interface 760 may be accessed through various methods, such as a web browser, command line interface (CLI), or network management protocols like Simple Network Management Protocol (SNMP). Through the management interface 760, the administrators can set up and modify SSIDs, security protocols, VLANs, and other operational parameters, ensuring the AP 700 operates effectively within the network environment.

The power interface 770 in the AP 700 may supply the necessary electrical power to the device, ensuring that the AP 700 may operate smoothly and effectively. This can be achieved through a direct power supply using an AC adapter connected to a power outlet, or via Power over Ethernet (POE), which delivers power through the same Ethernet cable used for data transmission.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising: obtaining, by an access point (AP), first basic service set (BSS) information of a first virtual AP in a first multiple basic service set identifier (MBSSID) group and second BSS information of a second virtual AP in a second MBSSID group, the first BSS information is associated with a first fast initial link setup (FILS) frame, and the second BSS information is associated with a second FILS frame;

determining, by the AP, that the first virtual AP and the second virtual AP belong to a same radio of the AP;

generating, by the AP, third BSS information based on the second BSS information, a size of the third BSS information is less than a size of the second BSS information;

generating, by the AP, a reduced neighbor report (RNR) information element (IE) based on the third BSS information; generating, by the AP, a target frame based on the RNR IE and the first BSS information, the target frame is one of a beacon frame or a FILS frame; and transmitting, by the AP, the target frame to a station.

2. The method according to claim 1, wherein generating, by the AP, the third BSS information based on the second BSS information comprises:

determining a BSS identification (BSSID) and a short service set identifier (SSID) of the second virtual AP based on the second BSS information; and generating the third BSS information based on the BSSID and the short SSID of the second virtual AP.

3. The method according to claim 1, wherein generating, by the AP, the RNR IE based on the third BSS information comprises:

determining a type of the second virtual AP, the type of the second virtual AP indicating that the second virtual AP is a transmitted virtual AP or a non-transmitted virtual AP; and generating the RNR IE by setting a co-located AP field of the RNR IE to true and setting a transmitted BSSID field of the RNR IE to the type of the second virtual AP.

4. The method according to claim 1, wherein the target frame is a first FILS frame for the first virtual AP, and the method further comprises:

generating a first beacon frame for the first virtual AP;

generating a second beacon frame for the second virtual AP; and transmitting the first beacon frame, the second beacon frame, and the first FILS frame, wherein an interval between the transmission of the first beacon frame and the transmission of the second beacon frame is less than an interval threshold, and an interval between the transmission of the first beacon frame and the transmission of the first FILS frame equals to a FILS discovery interval.

5. The method according to claim 1, wherein the target frame is a second FILS frame for the first virtual AP, and the method further comprises:

generating a third beacon frame for a third virtual AP, the third virtual AP is in a third MBSSID group and belonging to the same radio with the first virtual AP and the second virtual AP;

generating a fourth beacon frame for the second virtual AP; and transmitting the second FILS frame for the first virtual AP, the third beacon frame for the third virtual AP, and the fourth beacon frame for the second virtual AP, wherein an interval between the transmission of the second FILS frame and the transmission of the third beacon frame is less than an interval threshold, and an interval between the transmission of the third beacon frame and the transmission of the fourth beacon frame equals to a FILS discovery interval.

6. The method according to claim 5, further comprising:

generating a third FILS frame for the third virtual AP, an RNR IE of the third FILS frame comprising fourth BSS information of the first virtual AP; and transmitting the third FILS frame for the third virtual AP, wherein an interval between the transmission of the third FILS frame and the transmission of the fourth beacon frame for the second virtual AP is less than the interval threshold.

7. The method according to claim 6, further comprising:

generating a plurality of beacon frames for a plurality of transmitted virtual APs to be transmitted within a target beacon transmission time (TBTT) in a balanced manner; and transmitting the plurality of beacon frames at the FILS discovery interval.

8. The method according to claim 7, further comprising:

generating a plurality of FILS frames, RNR IEs of the plurality of FILS frames comprising BSS information of virtual APs in other MBSSID groups; and transmitting the plurality of FILS frames at the FILS discovery interval.

9. The method according to claim 1, wherein the target frame is a fifth beacon frame for the first virtual AP, and the method further comprises:

generating a fourth FILS frame for a fourth virtual AP, the fourth virtual AP in a fourth MBSSID group and belonging to the same radio as the first virtual AP and the second virtual AP;

transmitting the fourth FILS frame and the fifth beacon frame, wherein an interval between the transmission of the fourth FILS and the transmission of the fifth beacon frame is less than an interval threshold; and transmitting the fifth beacon frame and beacon frame for other MBSSID groups at a FILS discovery interval.

10. The method according to claim 1, wherein the target frame is a beacon frame for the first virtual AP, and the method further comprises:

generating a plurality of beacon frames for a plurality of MBSSID groups, wherein an RNR IE of each of the plurality of beacon frames comprises BSS information of virtual APs in other MBSSID groups; and transmitting the plurality of beacon frames at a FILS discovery interval.

11. An access point (AP) comprising:

at least one processor; and a memory coupled to the at least one processor, the memory storing instructions to cause the at least one processor to:

obtain first basic service set (BSS) information of a first virtual AP in a first multiple basic service set identifier (MBSSID) group and second BSS information of a second virtual AP in a second MBSSID group, the first BSS information is associated with a first fast initial link setup (FILS) frame, and the second BSS information is associated with a second FILS frame;

determine that the first virtual AP and the second virtual AP belong to a same radio of the AP;

generate third BSS information based on the second BSS information, a size of the third BSS information is less than a size of the second BSS information;

generate a reduced neighbor report (RNR) information element (IE) based on the third BSS information; generate a target frame based on the RNR IE and the first BSS information, the target frame is one of a beacon frame or a FILS frame; and transmit the target frame to a station.

12. The AP according to claim 11, wherein the instructions causing the at least one processor to generate the third BSS information based on the second BSS information comprise instructions causing the at least one processor to:

determine a BSS identification (BSSID) and a short service set identifier (SSID) of the second virtual AP based on the second BSS information; and generate the third BSS information based on the BSSID and the short SSID of the second virtual AP.

13. The AP according to claim 11, wherein the instructions causing the at least one processor to generate the RNR IE based on the third BSS information comprise instructions causing the at least one processor to:

determine a type of the second virtual AP, the type of the second virtual AP indicating that the second virtual AP is a transmitted virtual AP or a non-transmitted virtual AP; and generate the RNR IE by setting a co-located AP field of the RNR IE to true and setting a transmitted BSSID field of the RNR IE to the type of the second virtual AP.

14. The AP according to claim 11, wherein the target frame is a first FILS frame for the first virtual AP, and the memory further stores instructions to cause the at least one processor to:

generate a first beacon frame for the first virtual AP;

generate a second beacon frame for the second virtual AP; and transmit the first beacon frame, the second beacon frame, and the first FILS frame, wherein an interval between the transmission of the first beacon frame and the transmission of the second beacon frame is less than an interval threshold, and an interval between the transmission of the first beacon frame and the transmission of the first FILS frame equals to a FILS discovery interval.

15. The AP according to claim 11, wherein the target frame is a second FILS frame for the first virtual AP, and the memory further stores instructions to cause the at least one processor to:

generate a third beacon frame for a third virtual AP, the third virtual AP is in a third MBSSID group and belonging to the same radio with the first virtual AP and the second virtual AP;

generate a fourth beacon frame for the second virtual AP; and transmit the second FILS frame for the first virtual AP, the third beacon frame for the third virtual AP, and the fourth beacon frame for the second virtual AP, wherein an interval between the transmission of the second FILS frame and the transmission of the third beacon frame is less than an interval threshold, and an interval between the transmission of the third beacon frame and the transmission of the fourth beacon frame equals to a FILS discovery interval.

16. The AP according to claim 15, the memory further stores instructions to cause the at least one processor to:

generate a third FILS frame for the third virtual AP, an RNR IE of the third FILS frame comprising fourth BSS information of the first virtual AP; and transmit the third FILS frame for the third virtual AP, wherein an interval between the transmission of the third FILS frame and the transmission of the fourth beacon frame for the second virtual AP is less than the interval threshold.

17. The AP according to claim 16, the memory further stores instructions to cause the at least one processor to:

generate a plurality of beacon frames for a plurality of transmitted virtual APs to be transmitted within a target beacon transmission time (TBTT) in a balanced manner; and transmit the plurality of beacon frames at the FILS discovery interval.

18. The AP according to claim 17, the memory further stores instructions to cause the at least one processor to:

generate a plurality of FILS frames, RNR IEs of the plurality of FILS frames comprising BSS information of virtual APs in other MBSSID groups; and transmit the plurality of FILS frames at the FILS discovery interval.

19. The AP according to claim 11, wherein the target frame is a fifth beacon frame for the first virtual AP, and the memory further stores instructions to cause the at least one processor to:

generate a fourth FILS frame for a fourth virtual AP, the fourth virtual AP is in a fourth MBSSID group and belonging to the same radio as the first virtual AP and the second virtual AP;

transmit the fourth FILS frame and the fifth beacon frame, wherein an interval between the transmission of the fourth FILS and the transmission of the fifth beacon frame is less than an interval threshold; and transmit the fifth beacon frame and beacon frame for other MBSSID groups at a FILS discovery interval.

20. A non-transitory computer-readable medium comprising instructions stored thereon which, when executed by an access point (AP), cause the AP to:

obtain first basic service set (BSS) information of a first virtual AP in a first multiple basic service set identifier (MBSSID) group and second BSS information of a second virtual AP in a second MBSSID group, the first BSS information is associated with a first fast initial link setup (FILS) frame, and the second BSS information is associated with a second FILS frame;

determine that the first virtual AP and the second virtual AP belong to a same radio of the AP;

generate third BSS information based on the second BSS information, a size of the third BSS information is less than a size of the second BSS information;

generate a reduced neighbor report (RNR) information element (IE) based on the third BSS information;

generate a target frame based on the RNR IE and the first BSS information, the target frame is one of a beacon frame or a FILS frame; and transmit the target frame to a station.

* * * * *